US012628095B2

(12) United States Patent
Jin et al.

(10) Patent No.: US 12,628,095 B2
(45) Date of Patent: May 12, 2026

(54) TRANSMIT POWER CONTROL METHOD AND APPARATUS

(71) Applicant: HUAWEI TECHNOLOGIES CO., LTD., Guangdong (CN)

(72) Inventors: Tao Jin, Shanghai (CN); Lin Huang, Shanghai (CN); Chunlin Xue, Shanghai (CN); Yunhan Zhang, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 419 days.

(21) Appl. No.: 18/191,420

(22) Filed: Mar. 28, 2023

(65) Prior Publication Data

US 2023/0239812 A1     Jul. 27, 2023

Related U.S. Application Data

(63) Continuation of application No. PCT/CN2021/119277, filed on Sep. 18, 2021.

(30) Foreign Application Priority Data

Sep. 29, 2020     (CN) .......................... 202011051583.2

(51) Int. Cl.
*H04W 52/42* (2009.01)
*H04W 52/36* (2009.01)

(52) U.S. Cl.
CPC ........... *H04W 52/42* (2013.01); *H04W 52/36* (2013.01)

(58) Field of Classification Search
CPC ... H04W 52/42; H04W 52/36; H04W 52/146; H04W 52/242
See application file for complete search history.

(56) References Cited

U.S. PATENT DOCUMENTS

| | | | | |
|---|---|---|---|---|
| 7,747,271 B2 * | 6/2010 | Walton | .................. | H04W 52/42 |
| | | | | 455/39 |
| 10,321,401 B2 * | 6/2019 | Li | ........................ | H04W 52/243 |
| 11,523,350 B2 * | 12/2022 | Yao | ..................... | H04W 52/242 |
| 11,678,326 B2 * | 6/2023 | Wang | .................. | H04W 52/146 |
| | | | | 370/329 |
| 2019/0387471 A1 | 12/2019 | Salmela et al. | | |

(Continued)

FOREIGN PATENT DOCUMENTS

| | | | | |
|---|---|---|---|---|
| CA | 3127254 A1 * | 7/2020 | .......... | H04W 72/543 |
| CN | 104053222 A | 9/2014 | | |

(Continued)

OTHER PUBLICATIONS

Extended European Search Report in European Appln No. 21874286.4, dated Feb. 9, 2024, 8 pages.

(Continued)

*Primary Examiner* — Chandrahas B Patel
(74) *Attorney, Agent, or Firm* — Fish & Richardson P.C.

(57)     ABSTRACT

The present disclosure relates to transmit power control methods and apparatuses. In one example method, a network device determines a transmit power threshold corresponding to a spatial grid. The network device schedules a resource block (RB) or a carrier of one or more terminal devices corresponding to the spatial grid to control a transmit power corresponding to the spatial grid to be less than or equal to the transmit power threshold corresponding to the spatial grid.

18 Claims, 8 Drawing Sheets

(56)         References Cited

U.S. PATENT DOCUMENTS

2020/0021349  A1      1/2020   Chapman et al.
2022/0132436  A1*    4/2022   Hoshino  .............. H04L 5/0048

FOREIGN PATENT DOCUMENTS

| CN | 108064075 | A | 5/2018 |
|----|-----------|---|--------|
| CN | 111464219 | A | 7/2020 |
| WO | 2018056876 | A1 | 3/2018 |
| WO | 2020151748 | A1 | 7/2020 |

OTHER PUBLICATIONS

International Search Report and Written Opinion in International
Appln. No. PCT/CN2021/119277, mailed on Dec. 8, 2021, 15 pages
(with English translation).

* cited by examiner

Network
device

Terminal
device

S301

A network device determines a transmit power threshold corresponding to a spatial grid

S302

The network device schedules an RB or a carrier of one or more terminal devices corresponding to the spatial grid, to control a transmit power corresponding to the spatial grid to be less than or equal to the transmit power threshold corresponding to the spatial grid

RBG

1100

TRANSMIT POWER CONTROL METHOD AND APPARATUS

CROSS-REFERENCE TO RELATED APPLICATION

This application is a continuation of International Application No. PCT/CN2021/119277, filed on Sep. 18, 2021, which claims priority to Chinese Patent Application No. 202011051583.2, filed on Sep. 29, 2020. The disclosures of the aforementioned applications are hereby incorporated by reference in their entireties.

TECHNICAL FIELD

Embodiments of this application relate to the field of communication technologies, and in particular, to a transmit power control method and apparatus.

BACKGROUND

Non-ionizing radiation (NIR) in an electromagnetic field (EMF) is harmful to organisms mainly in terms of a thermal effect, a non-thermal effect, a cumulative effect, and the like. To protect from the NIR, the International Commission on Non-Ionizing Radiation Protection (ICNIRP) specifies different power spectral density limits for different frequencies. A power spectral density refers to a power value per unit area.

Currently, a network device performs extensive overall transmit power control on a cell, and transmit power utilization is not high. However, a value of a transmit power directly affects quality of a downlink channel, a received signal-to-noise ratio, and the like, and further affects a downlink throughput and user experience. In addition, with an increase in a bandwidth of a communication system, an increase in a quantity of users, and a higher requirement for low-latency real-time performance, there is an increasing demand for power resources, and a performance problem caused by insufficient power resources is further prominent. Therefore, a transmit power control solution is required, to improve the transmit power utilization of the network device, alleviate a problem of power resource limitation in a large-bandwidth multi-user scenario, improve performance of the downlink throughput, and meet a requirement for safety of radio wave electromagnetic radiation.

SUMMARY

Embodiments of this application provide a transmit power control method and apparatus, to resolve an existing problem that transmit power utilization is not high when a network device performs extensive overall transmit power control on a cell.

According to a first aspect, this application provides a transmit power control method. The method includes: A network device determines a transmit power threshold corresponding to a spatial grid. The network device schedules a resource block RB or a carrier of one or more terminal devices corresponding to the spatial grid, to control a transmit power corresponding to the spatial grid to be less than or equal to the transmit power threshold corresponding to the spatial grid. Optionally, a quantity of spatial grids is N, and N is a positive integer greater than or equal to 2.

According to the foregoing method, the network device may divide space into a plurality of spatial grids, and control, by using the spatial grid (an angle range) as a granularity, a transmit power corresponding to each spatial grid to not exceed a transmit power threshold corresponding to the spatial grid. In this way, a full transmit power can be achieved in each angle range, and transmit power utilization is improved, to avoid a problem in a conventional technology that transmit power utilization is not high when extensive overall transmit power control is performed on a cell, for example, transmit power control is performed based on a minimum safety distance for the entire cell.

In a possible design, that the network device schedules an RB of one or more terminal devices corresponding to the spatial grid includes: The network device enables a plurality of terminal devices corresponding to the spatial grid to share the RB. Alternatively, the network device reduces a power spectral density of the RB of the one or more terminal devices corresponding to the spatial grid. Alternatively, the network device reduces a quantity of RBs of the one or more terminal devices corresponding to the spatial grid. That the network device reduces a quantity of RBs of the one or more terminal devices corresponding to the spatial grid includes: The network device schedules RBs at an interval for the one or more terminal devices corresponding to the spatial grid.

In the foregoing design, when a transmit power corresponding to a spatial grid exceeds a transmit power threshold corresponding to the spatial grid, the network device may back off, in the foregoing plurality of RB scheduling manners, only the transmit power corresponding to the spatial grid, to avoid back-off of overall transmit powers of the cell. This helps improve the transmit power utilization.

In a possible design, that the network device schedules an RB of one or more terminal devices corresponding to the spatial grid includes: The network device performs power back-off and/or beam gain suppression on a beam corresponding to the spatial grid.

In the foregoing design, when a transmit power corresponding to a spatial grid exceeds a transmit power threshold corresponding to the spatial grid, the network device may perform power back-off and/or beam gain suppression on a beam corresponding to the spatial grid, and control only the transmit power of the spatial grid (or a beam domain corresponding to the spatial grid), to avoid the back-off of the overall transmit powers of the cell. This helps improve the transmit power utilization.

In a possible design, that the network device schedules a carrier of one or more terminal devices corresponding to the spatial grid includes: The network device schedules carriers at an interval for the one or more terminal devices in a beam domain corresponding to the spatial grid.

In the foregoing design, when a transmit power corresponding to a spatial grid exceeds a transmit power threshold corresponding to the spatial grid, the network device schedules carriers at an interval for the one or more terminal devices in a beam domain corresponding to the spatial grid, to control a transmit power of the beam domain corresponding to the spatial grid, and further back off (that is, reduce) the transmit power corresponding to the spatial grid, to avoid the back-off of the overall transmit powers of the cell. This helps improve the transmit power utilization.

In a possible design, the network device determines the transmit power corresponding to the spatial grid based on a sum of projected powers that are on the spatial grid and that are of power weight vectors corresponding to the one or more terminal devices communicating with the network device.

In the foregoing design, the network device determines the transmit power corresponding to the spatial grid based on the sum of the projected powers that are on the spatial grid and that are of the power weight vectors corresponding to the one or more terminal devices communicating with the network device. This helps accurately determine the transmit power corresponding to the spatial grid, and therefore, improve accuracy of transmit power control.

In a possible design, the transmit power threshold corresponding to the spatial grid satisfies a formula $E=4\pi R^2 S$. E is the transmit power threshold corresponding to the spatial grid, S is a power spectral density limit, and R is a safety distance corresponding to the spatial grid.

In a possible design, the method further includes: The network device performs spatial grid division based on an antenna pattern.

In the foregoing design, the network device may perform spatial grid division based on the antenna pattern, and spatial directions with same or similar radiation intensity are divided to form one spatial grid, to ensure that antenna gains in a plurality of spatial directions included in a same spatial grid are the same or similar. This helps the network device control or adjust a transmit power corresponding to the spatial grid.

According to a second aspect, an embodiment of this application provides a transmit power control apparatus. The apparatus has a function of implementing the method according to any one of the first aspect or the possible designs of the first aspect. The function may be implemented by hardware, or by hardware by executing corresponding software. The hardware or the software includes one or more units (modules), for example, a transceiver unit and a processing unit, corresponding to the function.

In a possible design, the apparatus may be a chip or an integrated circuit.

In a possible design, the apparatus includes a processor and a transceiver. The processor is coupled to the transceiver, and is configured to implement a function of the method according to any one of the first aspect or the possible designs of the first aspect. The apparatus may further include a memory. The memory stores a program that may be executed by the processor to implement the function of the method according to any one of the first aspect or the possible designs of the first aspect.

In a possible design, the apparatus may be a network device.

According to a third aspect, an embodiment of this application provides a computer-readable storage medium. The computer-readable storage medium has a computer program or instructions that is/are used to perform the method according to any one of the first aspect or the possible designs of the first aspect.

According to a fourth aspect, an embodiment of this application further provides a computer program product, including a computer program or instructions. When the computer program or the instructions is/are executed, the method according to any one of the first aspect or the possible designs of the first aspect may be implemented.

According to a fifth aspect, this application further provides a chip. The chip is configured to implement the method according to any one of the first aspect or the possible designs of the first aspect.

According to a sixth aspect, this application further provides a communication apparatus. The communication apparatus includes a processor. The processor is coupled to a memory, the memory is configured to store a computer program or instructions, and the processor is configured to execute the computer program or the instructions in the memory, to enable the communication apparatus to perform the method according to the first aspect.

According to a seventh aspect, this application further provides an apparatus. The apparatus is configured to perform the method according to the first aspect.

For technical effects that can be achieved by the second aspect to the seventh aspect, refer to the technical effects that can be achieved by the first aspect. Details are not described herein again.

DESCRIPTION OF EMBODIMENTS

Figure 1:
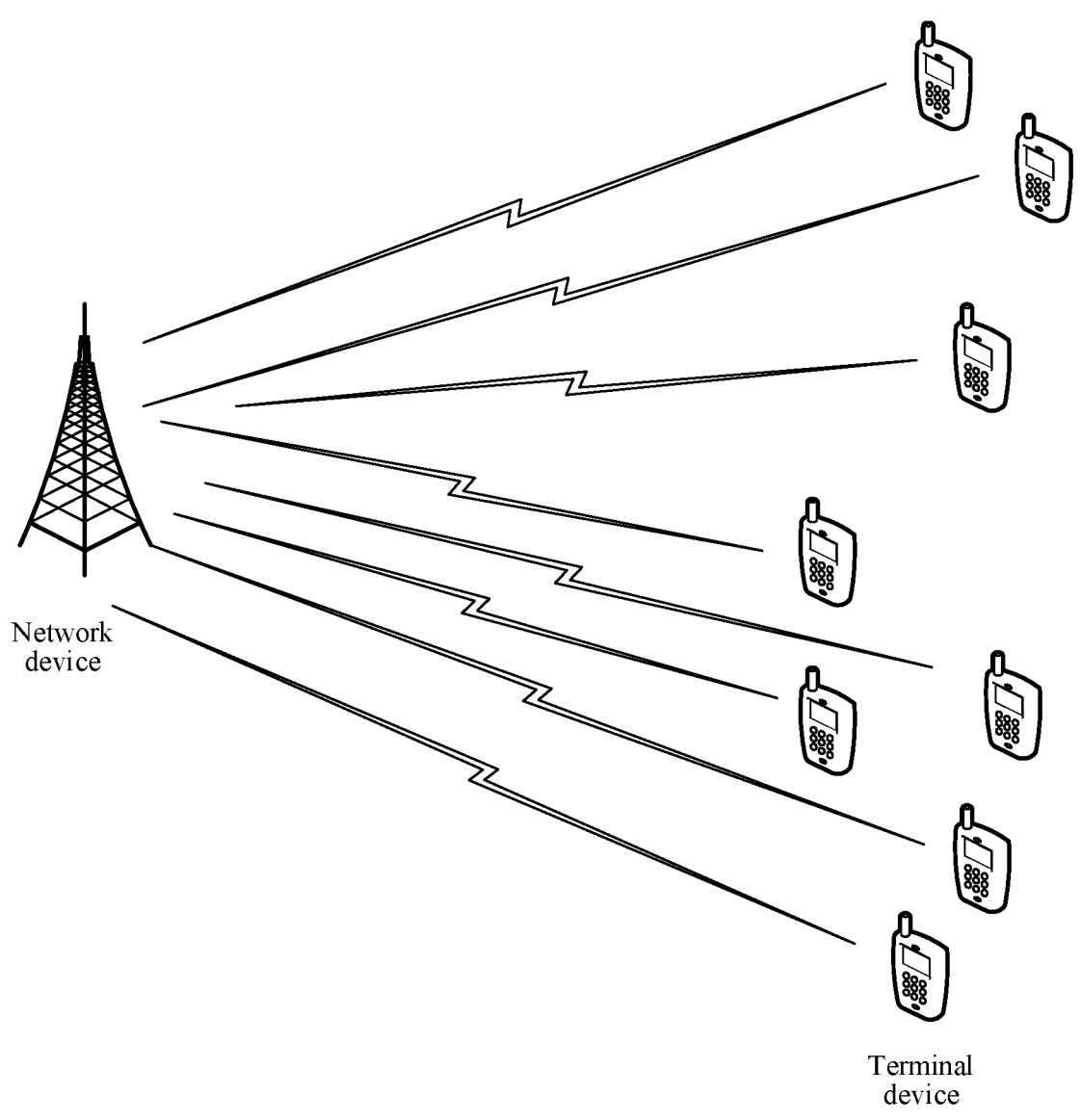
FIG. 1 is a schematic diagram of an architecture of a communication system according to an embodiment of this application.

The technical solutions in embodiments of this application may be applied to various communication systems, for example, a massive multiple-input multiple-output (massive MIMO) system, a long term evolution (LTE) system, an LTE time division duplex (TDD) system, an LTE frequency division duplex (FDD) system, a 5th generation (5G) mobile communication system, or a new radio (NR) system, or applied to a future communication system or another similar communication system such as a 6G system. For example, the technical solutions are applicable to networking scenarios such as an uplink and downlink decoupling scenario, a carrier aggregation (CA) scenario, and a dual connectivity (DC) scenario of the foregoing various communication systems. Specifically, a structure of a communication system to which embodiments of this application are applied may be shown in FIG. 1. The communication system includes a network device and at least one terminal device. The network device communicates with the at least one terminal device.

For ease of understanding by a person skilled in the art, the following explains and describes some terms in embodiments of this application.

(1) A terminal device is a device having a wireless transceiver function, and may be deployed on land, including an indoor or outdoor device, a hand-held device, a wearable device, or a vehicle-mounted device; may be deployed on water (for example, on a ship); or may be deployed in the air (for example, on an airplane, a balloon, and a satellite). The terminal device may communicate with a core network through a radio access network (RAN), and exchange a voice and/or data with the RAN. The terminal device may be a mobile phone, a tablet computer, a computer having a wireless transceiver function, a mobile internet device, a wearable device, a virtual reality terminal device, an augmented reality terminal device, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, or the like. An application scenario is not limited in embodiments of this application. Sometimes, the terminal device may also be referred to as user equipment (UE), a mobile station, a remote station, or the like. A specific technology, a device form, and a name that are used by the terminal device are not limited in embodiments of this application.

By way of example and not limitation, in embodiments of this application, the terminal device may alternatively be a wearable device. The wearable device may also be referred to as a wearable intelligent device, an intelligent wearable device, or the like, and is a general term of wearable devices, such as glasses, gloves, watches, clothes, and shoes, that are intelligently designed and developed for daily wear by applying wearable technologies. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, such as smart watches or smart glasses, and devices that focus on only one type of application function and need to be used with other devices such as smartphones, such as various smart bands, smart helmets, or smart jewelry for monitoring physical signs.

The terminal device in embodiments of this application may alternatively be a vehicle-mounted module, a vehicle-mounted component, a vehicle-mounted chip, or a vehicle-mounted unit that is built in a vehicle as one or more components or units. The vehicle may use the vehicle-mounted module, a vehicle-mounted module assembly, the vehicle-mounted component, the vehicle-mounted chip, or the vehicle-mounted unit that is built in the vehicle to implement a method in this application.

(2) A network device, also referred to as an access network device, is a device that is in a network and that is configured to connect a terminal device to a wireless network. The network device may be a node in a radio access network, and may also be referred to as a base station, or may also be referred to as a RAN node (or device). The network device may be an evolved NodeB (eNodeB) in an LTE system or an LTE-advanced (LTE-A) system, may be a next generation NodeB (gNodeB) in a 5G NR system, may be a transmission reception point (TRP), a baseband unit (BBU), a Wi-Fi access point (AP), or the like, or may be a central unit (CU) and a distributed unit (DU). This is not limited in embodiments of this application. In a split deployment scenario in which the access network device includes the CU and the DU, the CU supports protocols such as a radio resource control (RRC) protocol, a packet data convergence protocol (PDCP), and a service data adaptation protocol (SDAP); and the DU mainly supports a radio link control (RLC) layer protocol, a media access control (MAC) layer protocol, and a physical layer protocol.

(3) A power spectral density limit may also be referred to as a power spectral density requirement or an EMF strength requirement. NIR in an EMF is harmful to organisms in terms of a thermal effect, a non-thermal effect, and a cumulative effect. To protect the organism from exposure to the NIR, the ICNIRP specifies different power spectral density limits for different frequencies, that is, limits EMF strength at the different frequencies. The power spectral density is a power value per unit area, which indicates an accumulated power unit per unit sphere area (w/m^2).

Currently, some countries directly use the power spectral density limits of the ICNIRP, and other countries specify corresponding power spectral density limits. For some frequency bands, the ICNIRP or a country may directly specify a power spectral density limit (unit: w/m^2) in the frequency bands. If a frequency range of a network device is in the frequency bands, the power spectral density limit in the frequency bands is directly used. Alternatively, for some frequency bands, the ICNIRP or a country may specify a power spectral density limit per unit bandwidth (unit: w/m^2/MHz). If a frequency range of a network device is in the frequency bands, the power spectral density limit (or requirement) may be determined based on a product of a system bandwidth B (unit: MHz) of the network device and the power spectral density limit per unit bandwidth (unit: w/m^2/MHz).

A maximum transmit power of the network device (namely, a transmit power threshold of the network device) allowed at a test point may be calculated by using the following formula: $E=4\pi R^2 S$. E is the transmit power threshold, S is the power spectral density limit, and R is a distance between the test point and the network device. A transmit power of the network device is related to an input power (P) of an antenna port and an antenna gain (G) that are of the network device. G represents an amplification multiple of P. To be specific, it is required that P*G of the network device should not exceed the transmit power threshold.

Figures 2, 3:
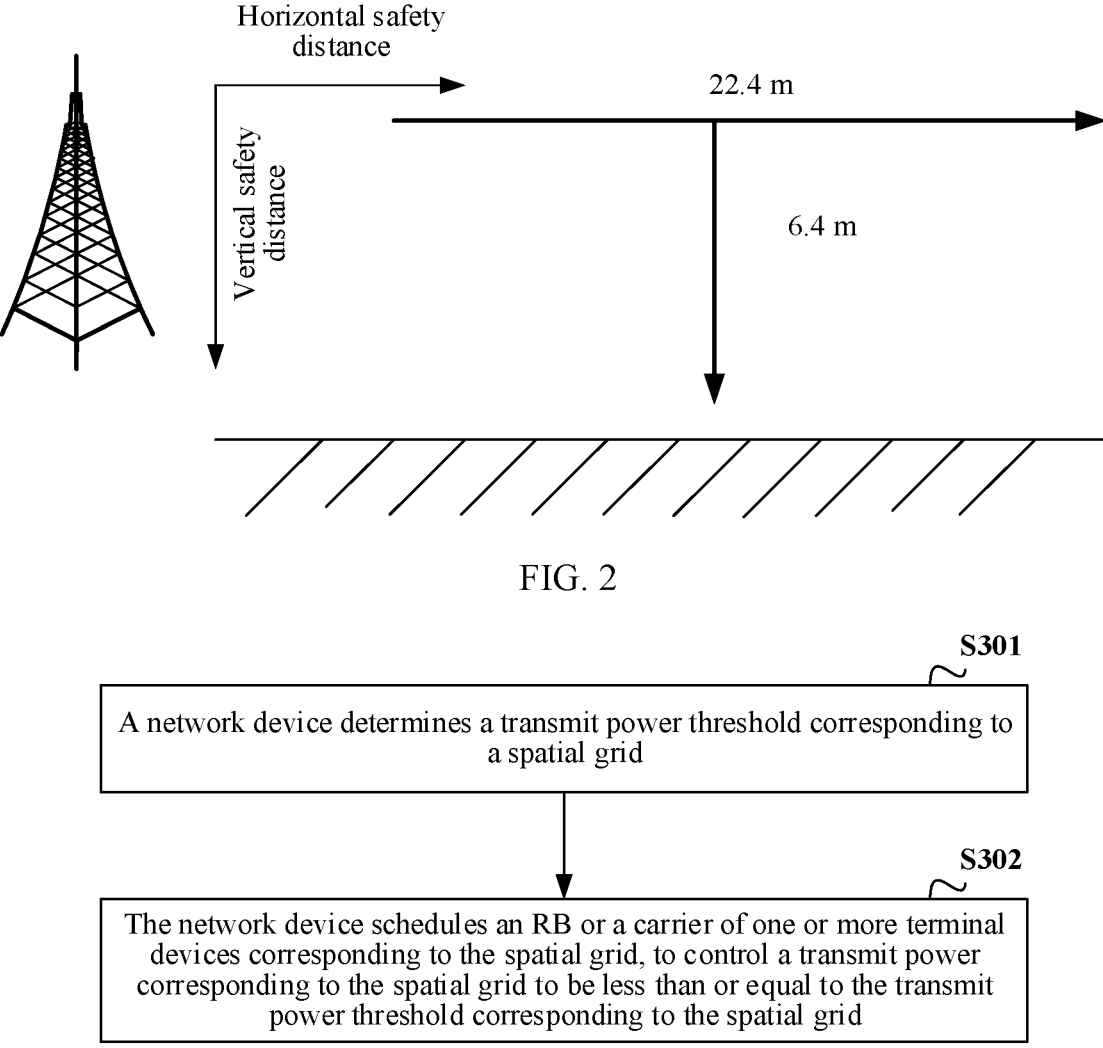
FIG. 2 is a schematic diagram of horizontal and vertical safety distances according to an embodiment of this application.
FIG. 3 is a first schematic flowchart of a transmit power control method according to an embodiment of this application.

Table 1 shows configurations of a maximum input power of an antenna port and a maximum antenna gain (Ant gain) that are of a network device in different frequency bands in the case of a power spectral density limit (or requirement) under constraints of a horizontal safety distance of 22.4 m and a vertical safety distance of 6.4 m as shown in FIG. 2.

TABLE 1

| Band | Power (w) | Ant gain |
|---|---|---|
| 800 M | 40 | 16 |
| 900 M | 40 | 16 |
| 1.8 G | 80 | 17.5 |
| 2.1 G | 60 | 18 |
| 2.6 G | 80 | 18 |
| 700 M | 40 | 15.5 |
| 3.5 G | 200 | 24 |

Protection from NIR brings the following problems to deployment of the network device (a site): 1. Difficulty in deployment of a new RAT: Because EMF strength of current 2G/3G/4G is close to an EMF strength requirement, it is difficult to deploy 5G. 2. Difficulty in deployment of a new frequency: A frequency of 900 M/1.8 G/2.1 G is already deployed. In this case, if a new frequency, for example, 2.3 G/2.6 G is further deployed, the EMF strength exceeds the EMF strength requirement. In addition, deployment of an independent site for the new frequency results in high construction costs. 3. Difficulty in deployment of a single antenna: Because a single antenna port is limited by the EMF strength requirement, a plurality of ports or a plurality of antennas need to be deployed in a distributed manner. 4. Difficulty in deployment of a macro site: In a central business district (CBD) or an urban area, because a safety distance is small, a power of a macro site is limited. In this case, only a micro site can be deployed. However, the micro site is close to the public, and therefore, may be required to be subject to a specific absorption rate (SAR) test. Test costs are high, and a design may be changed.

In particular, after an active antenna unit (AUU) of massive MIMO is launched, a transmit power of the AAU is very high (for example, can reach 200 W), and an antenna gain is very high (for example, can reach 24 dBi). If a conventional method for calculating a safety distance is used, site deployment is more difficult. An EMF has become one of bottlenecks that limit rapid commercial use of high-power modules of 5G massive MIMO.

In view of the foregoing problem, embodiments of this application provide a transmit power control solution. In this solution, space may be divided into a plurality of spatial grids, and a spatial grid is used as a granularity, to control a transmit power corresponding to each control grid to not exceed a transmit power threshold corresponding to the spatial grid. Therefore, a problem that transmit power utilization is not high when extensive overall transmit power control is performed on a cell, for example, transmit power control is performed based on an overall minimum safety distance for the cell, is avoided.

In addition, it should be understood that in embodiments of this application, at least one may be alternatively described as one or more, and more may represent two, three, four, or more. This is not limited in this application. In embodiments of this application, "/" may represent an "or" relationship between associated objects. For example, A/B may represent A or B. "And/or" may be used to indicate that there are three relationships between associated objects. For example, A and/or B may represent the following three cases: Only A exists, both A and B exist, and only B exists. A and B may be singular or plural. To facilitate description of the technical solutions in embodiments of this application, in embodiments of this application, terms such as "first" and "second" may be used to distinguish between technical features with same or similar functions. The terms such as "first" and "second" do not limit a quantity and an execution sequence, and the terms such as "first" and "second" do not indicate a definite difference. In embodiments of this application, the term such as "example" or "for example" is used to represent an example, an illustration, or a description. Any embodiment or design scheme described with "example" or "for example" should not be explained as being more preferred or having more advantages than another embodiment or design scheme. Use of the term such as "example" or "for example" is intended to present a related concept in a specific manner for ease of understanding.

The following describes embodiments of this application in detail with reference to the accompanying drawings.

FIG. 3 is a schematic flowchart of a transmit power control method according to an embodiment of this application. The method includes the following steps.

S301: A network device determines a transmit power threshold corresponding to a spatial grid.

In this embodiment of this application, the spatial grid may be understood as a concept of an angle domain or an angle range, and the angle range includes a horizontal plane angle range and a vertical plane angle range. It may be understood that one spatial grid may be determined based on a horizontal plane angle range and a vertical plane angle range. A spatial grid i is used as an example. A horizontal plane angle range of the spatial grid i may be understood as an angle range of the spatial grid i on a horizontal plane, and a vertical plane angle range of the spatial grid i may be understood as an angle range of the spatial grid i on a vertical plane.

The spatial grid may include one or more spatial directions within an angle range, and any spatial direction may be determined by using a horizontal plane angle and a vertical plane angle. A horizontal plane angle of any spatial direction may be understood as an angle of the spatial direction on a horizontal plane, and a vertical plane angle may be understood as an angle of the spatial direction on a vertical plane.

In an example, the horizontal plane angle range of the spatial grid i is from a minimum horizontal plane angle $H\_i_{min}$ to a maximum horizontal plane angle $H\_i_{max}$, and the vertical plane angle range of the spatial grid i is from a minimum vertical plane angle $V\_i_{min}$ to a maximum vertical plane angle $V\_i_{max}$. The spatial grid i may include all spatial directions in the horizontal plane angle range from $H\_i_{min}$ to $H\_i_{max}$ and the vertical plane angle range from $V\_i_{min}$ to $V\_i_{max}$.

In this example, $H\_i_{min}$ to $H\_i_{max}$ are continuous, and $V\_i_{min}$ to $V\_i_{max}$ are continuous. In addition, it should be noted that the horizontal plane angle range and/or the vertical plane angle range of the spatial grid may alternatively be discontinuous.

Figure 4:
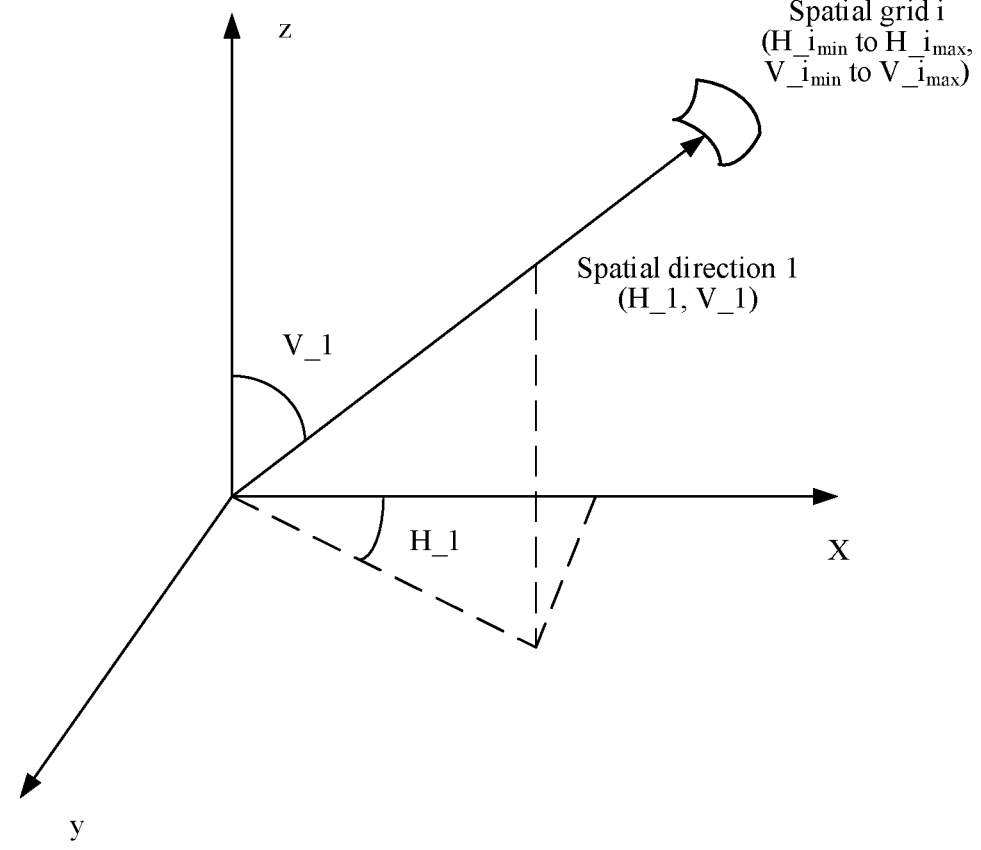
FIG. 4 is a schematic diagram of a spatial grid according to an embodiment of this application.

As shown in FIG. 4, a coordinate system may be constructed by using a location of the network device or an antenna of the network device as an origin of the coordinate system. The coordinate system includes three coordinate axes: an x-axis, a y-axis, and a z-axis. A plane formed by the x-axis and the y-axis may be referred to as a horizontal plane, and a plane formed by the y-axis and the z-axis may be referred to as a vertical plane. In the coordinate system, an angle between a projection of a spatial direction on the horizontal plane and the x-axis may be referred to as a horizontal plane angle, and an angle between a projection of a spatial direction on the vertical plane and the z-axis may be referred to as a vertical plane angle.

In the coordinate system, a spatial direction pointing from the origin may be determined based on a horizontal plane angle and a vertical plane angle. For example, a horizontal plane angle of a spatial direction 1 is H_1, a vertical plane angle of the spatial direction 1 is V_1, and the spatial direction 1 may be represented as (H_1, V_1). The spatial grid i may include all spatial directions pointing to a curved surface, and all the spatial directions pointing to the curved surface satisfy that the horizontal plane angle range is from $H\_i_{min}$ to $H\_i_{max}$, and the vertical plane angle range is from $V\_i_{min}$ to $V\_i_{max}$. For example, the spatial grid i includes the spatial direction 1 (H_1, V_1).

Specifically, the network device may divide a coverage area of an antenna beam of the network device into N spatial grids. N is a positive integer greater than or equal to 2. In an example, the network device may divide space into spatial grids based on a spatial grid granularity requirement. For example, the spatial grid granularity requirement is that a horizontal plane angle range should not exceed m degrees, and a vertical plane angle range should not exceed n degrees, where m and n are greater than 0. Optionally, when performing spatial grid division, the network device may perform division in an even manner or in an uneven manner.

In addition, an antenna pattern of the network device records a pattern in which relative field strength (a normalized modulus value) of a radiation field changes with a direction at a specific distance from the network device (or the antenna of the network device), and is usually represented by using two plane patterns, for example, represented by using a horizontal plane antenna pattern and a vertical plane antenna pattern, that are perpendicular to each other in a maximum radiation direction of the antenna. In a possible implementation, the network device may further perform spatial grid division based on the antenna pattern, and spatial directions with same or similar radiation intensity are divided to form one spatial grid, to ensure that antenna gains in a plurality of spatial directions included in the same spatial grid are the same or similar. This helps the network device control or adjust a transmit power corresponding to the spatial grid.

In an example, the network device may construct the coordinate system based on a horizontal plane and a vertical plane that are of the antenna pattern. To be specific, the horizontal plane in the coordinate system constructed by the network device and the horizontal plane of the antenna pattern are a same plane, and the vertical plane in the coordinate system constructed by the network device and the vertical plane of the antenna pattern are a same plane. The spatial directions with same or similar radiation intensity are divided to form the one spatial grid based on radiation intensity shown in the antenna pattern.

A transmit power threshold (E) corresponding to the spatial grid is related to a safety distance (R) corresponding to the spatial grid and a power spectral density limit S. The safety distance corresponding to the spatial grid may be determined by an operator or a regulatory authority, or may be determined based on a distance between a network device on a spatial grid (namely, an angle range corresponding to the spatial grid) in an actual geographical environment and a nearest building, or may be determined based on a distance between the network device on the spatial grid (namely, the angle range corresponding to the spatial grid) in the actual geographical environment and a nearest human activity area.

The spatial grid i is used as an example. In an example, a transmit power threshold corresponding to the spatial grid i satisfies a formula $E=4\pi R^2 S$. E is the transmit power threshold corresponding to the spatial grid i, S is the power spectral density limit, and R is a safety distance corresponding to the spatial grid i. It should be understood that the transmit power threshold E is related to the safety distance R corresponding to the spatial grid i. When R has different values, E also has different values.

For example, if a safety distance corresponding to a spatial grid 1 is 10 m, and a safety distance corresponding to a spatial grid 2 is 15 m, a transmit power threshold $E_1$ corresponding to the spatial grid 1 is different from a transmit power threshold $E_2$ corresponding to the spatial grid 2.

S302: The network device schedules a resource block (RB) or a carrier of one or more terminal devices corresponding to the spatial grid, to control a transmit power corresponding to the spatial grid to be less than or equal to the transmit power threshold corresponding to the spatial grid.

A MIMO beam has a time characteristic. A spatial direction of a beam at a moment may be determined by a location of the terminal device. Directions of a plurality of beams may be different at different moments. Therefore, a transmit power corresponding to one spatial grid may change with time. A transmit power corresponding to a spatial grid at any moment may be determined based on a sum of projected powers that are on the spatial grid and that are of power weight vectors (namely, powers applied to a spatial direction in which the terminal device is located) corresponding to the one or more terminal devices communicating with the network device at the moment.

In addition, because the spatial grid may include a plurality of spatial directions, the projected power on the spatial grid may be a projected power in any spatial direction included in the spatial grid. The sum of the projected powers corresponding to the spatial grid may be a sum of projected powers in any spatial direction included in the spatial grid.

Figure 5:
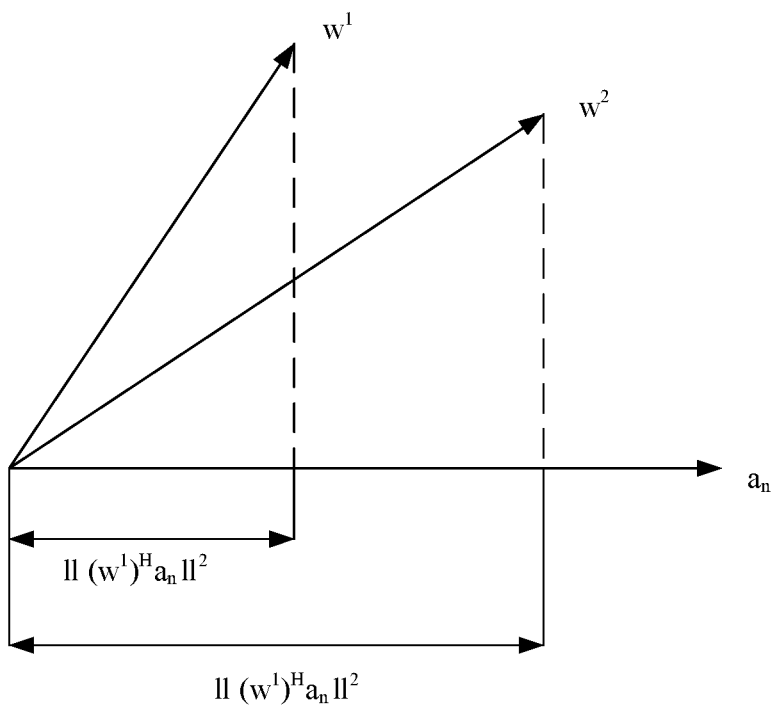
FIG. 5 is a schematic diagram of calculating a projected power according to an embodiment of this application.

FIG. 5 is a schematic diagram of projected powers that are on a spatial grid and that are of power weight vectors (powers applied to spatial directions of terminal devices) corresponding to two terminal devices communicating with a network device. As shown in FIG. 5, $a_n$ is a unit spatial direction vector corresponding to the spatial grid, $w^1$ is a power weight vector corresponding to a terminal device, $w^2$ is a power weight vector corresponding to a terminal device, a projected power of $w^1$ on $a_n$ is $$\left\| (w^1)^H a_n \right\|^2,$$

and a projected power of $w^2$ on $a_n$ is $$\left\| (w^2)^H a_n \right\|^2.$$

In this case, a sum of the projected powers corresponding to the spatial grid, namely, a transmit power corresponding to the spatial grid, is $$\left\| (w^1)^H a_n \right\|^2 + \left\| (w^2)^H a_n \right\|^2.$$

H represents transposition.

The unit spatial direction vector corresponding to the spatial grid may be a unit spatial direction vector of any spatial direction included in the spatial grid. For example, the unit spatial direction vector corresponding to the spatial grid is a unit spatial direction vector of a spatial direction with a minimum horizontal plane angle and a minimum vertical plane angle in a plurality of spatial directions included in the spatial grid, or a unit spatial direction vector of a spatial direction with a maximum horizontal plane angle and a maximum vertical plane angle in the plurality of spatial directions included in the spatial grid, or a unit spatial direction vector of any one of the plurality of spatial directions included in the spatial grid.

In addition, an example in which $a_n$ is the unit spatial direction vector corresponding to the spatial grid is used for description above. It should be understood that when $a_n$ is a non-unit spatial direction vector, a sum of projected powers on the non-unit spatial direction vector needs to be converted into a sum of projected powers on a unit spatial direction vector. To be specific, the sum of the projected powers on the non-unit spatial direction vector $a_n$ needs to be divided by a length of the non-unit spatial direction vector $a_n$, that is, divided by a modulus of the non-unit spatial direction vector $a_n$.

The transmit power corresponding to the spatial grid is controlled, so that the transmit power corresponding to the spatial grid is less than or equal to a transmit power threshold corresponding to the spatial grid. The network device may schedule an RB or a carrier of one or more terminal devices corresponding to the spatial grid.

The following describes an implementation in which the network device schedules the RB or the carrier of the one or more terminal devices corresponding to the spatial grid, to reduce the transmit power corresponding to the spatial grid.

Implementation 1: The network device enables a plurality of terminal devices corresponding to the spatial grid to share the RB.

Figure 6:
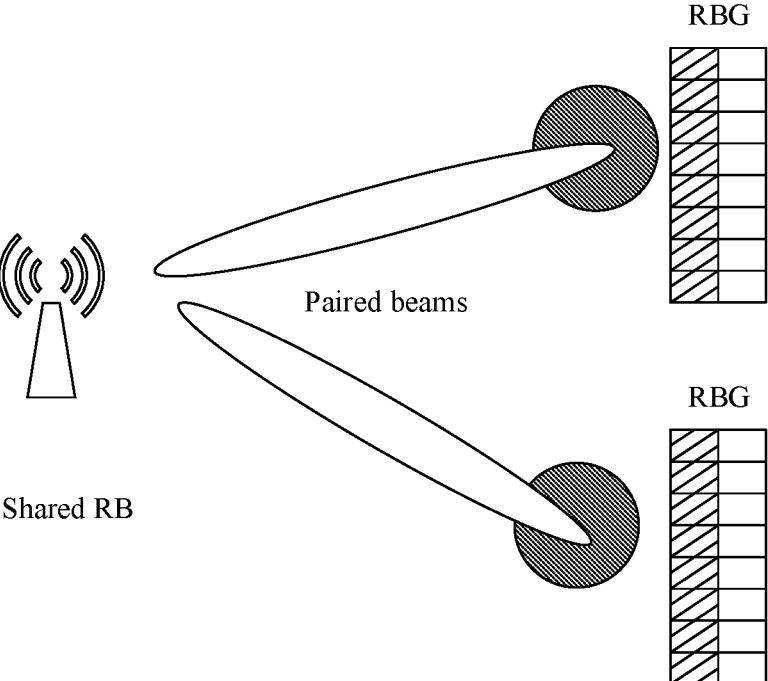
FIG. 6 is a first schematic diagram of RB scheduling according to an embodiment of this application.

A multi-user (MU) MIMO technology can reduce a power spectral density (or a power). When the network device determines that the transmit power corresponding to the spatial grid exceeds the transmit power threshold corresponding to the spatial grid, the network device may enable a plurality of terminal devices within an angle range corresponding to the spatial grid to share the RB, and a power on the shared RB is evenly shared, so that the transmit power corresponding to the spatial grid is reduced, and the transmit power corresponding to the spatial grid is less than or equal to the transmit power threshold corresponding to the spatial grid. For example, as shown in FIG. 6, one grid represents one RB, and a shadow part represents a power occupied by an actually used RB after a plurality of terminal devices share the RB (a power occupied by an original RB is a power occupied by an entire grid). It can be learned that when a quantity of scheduled RBs remains unchanged, a total power on actually scheduled RBs is reduced. In FIG. 6, the total power on the actually scheduled RBs is reduced to half of the power before the plurality of terminal devices share the RB. To be specific, a power on a resource block group (RBG) is reduced to half of the power before the plurality of terminal devices share the RB. The RBG includes a plurality of RBs.

Implementation 2: The network device reduces a power spectral density of the RB of the one or more terminal devices corresponding to the spatial grid. That is, the network device reduces a power of the RB of the one or more terminal devices corresponding to the spatial grid.

Figure 7:
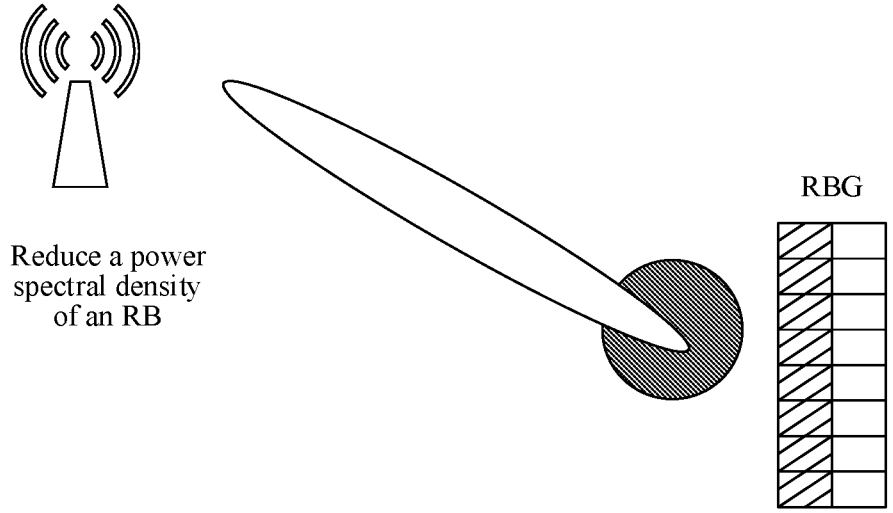
FIG. 7 is a second schematic diagram of RB scheduling according to an embodiment of this application.

It can be learned from $E=4\pi R^2 S$ that, E represents a transmit power, and S represents an actual power spectral density. When S decreases, E also decreases. When the network device determines that a transmit power corresponding to a spatial grid exceeds a transmit power threshold corresponding to the spatial grid, the network device may further reduce a power spectral density of an RB of one or more terminal devices within an angle range corresponding to the spatial grid, so that a power of the RB of the one or more terminal devices within the angle range corresponding to the spatial grid is reduced. Therefore, the transmit power corresponding to the spatial grid is reduced, and the transmit power corresponding to the spatial grid is less than or equal to the transmit power threshold corresponding to the spatial grid. For example, as shown in FIG. 7, one grid represents one RB, and a shadow part represents a power occupied by an actually used RB after a power spectral density is reduced (a power occupied by an original RB is a power occupied by an entire grid). It can be learned that when a quantity of scheduled RBs remains unchanged, a total power on actually scheduled RBs is reduced.

Implementation 3: The network device decreases a quantity of RBs of the one or more terminal devices corresponding to the spatial grid.

Figure 8:
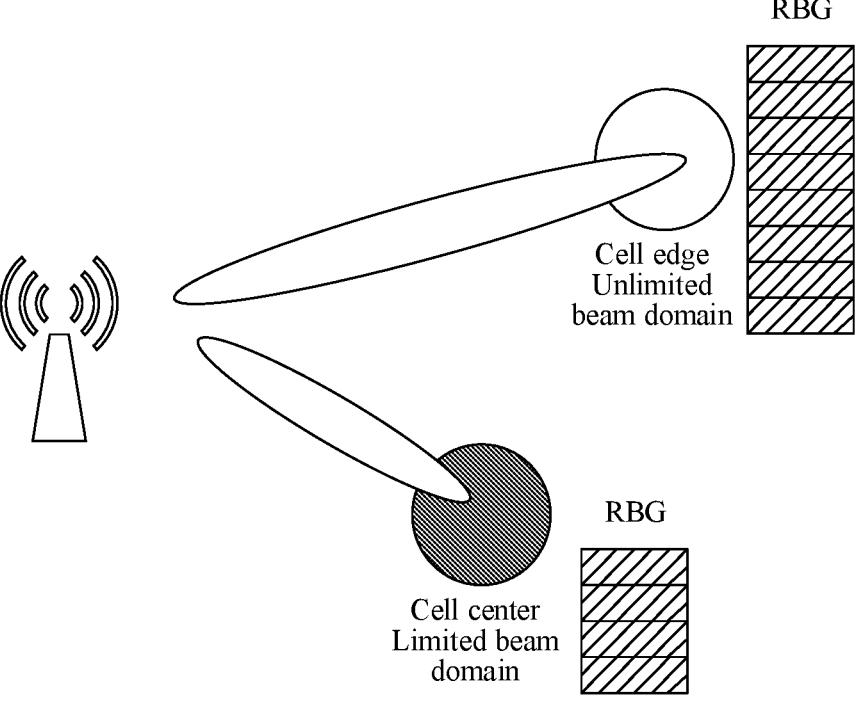
FIG. 8 is a third schematic diagram of RB scheduling according to an embodiment of this application.

As shown in FIG. 8, when the network device determines that a transmit power corresponding to a spatial grid exceeds a transmit power threshold corresponding to the spatial grid, the network device may further reduce a quantity of RBs of one or more terminal devices within an angle range corresponding to the spatial grid. For example, the network device enables a power occupied by an actually used RB to be the transmit power threshold corresponding to the spatial grid, to allocate a quantity of RBs to each terminal device, and then performs proportional allocation based on a quantity of actually used RBs according to an original RB resource requirement of the terminal device. The quantity of RBs of the one or more terminal devices within the angle range corresponding to the spatial grid decreases, and a total power occupied by the RBs decreases (a power of an RBG decreases), so that the transmit power corresponding to the spatial grid decreases, and therefore, the transmit power threshold corresponding to the spatial grid is met.

In a possible implementation, when reducing the quantity of RBs of the one or more terminal devices corresponding to the spatial grid, the network device may schedule RBs at an interval for the one or more terminal devices corresponding to the spatial grid.

Figure 9:
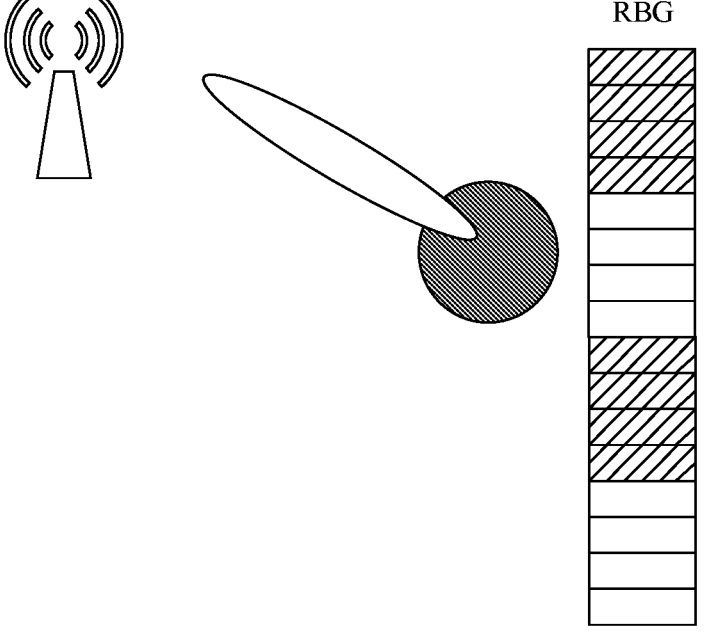
FIG. 9 is a fourth schematic diagram of RB scheduling according to an embodiment of this application.

In an example, the network device may schedule RBs at an equal interval. For example, one RB is used as the interval, two RBs are used as the interval, or four RBs are used as the interval. A specific quantity of RBs at the interval may be predefined in a protocol, or may be determined by the network device. For example, the interval is randomly selected from a preconfigured group of optional intervals. As shown in FIG. 9, the network device may schedule RBs at an interval of four RBs for one or more terminal devices corresponding to a spatial grid.

Implementation 4: The network device performs power back-off and/or beam gain suppression on a beam corresponding to the spatial grid.

A MIMO beam is different from a conventional beam. In a conventional technology, a wide beam is formed in space, energy is centralized, and a power in each spatial direction is the same. For example, the power in each spatial direction may be a maximum power. However, based on a MIMO technology, several thin beams may be formed in space at the same time, energy is not centralized, directions of the beams are different, and a power of each beam cannot reach a maximum power. For example, M beams may evenly share the maximum power.

It can be learned from $E=P*G$ that, E represents a transmit power, and a transmit power corresponding to a spatial grid is related to an input power (P) of an antenna port of a beam corresponding to the spatial grid and a gain (G) of an antenna on the beam. When the network device determines that the transmit power corresponding to the spatial grid exceeds a transmit power threshold corresponding to the spatial grid, the network device may perform power back-off and/or beam gain suppression on the beam corresponding to the spatial grid (or a beam domain corresponding to the spatial grid). To be specific, the input power of the antenna port of the beam and/or the gain of the antenna on the beam are/is reduced, so that a power of the beam is reduced, and the transmit power corresponding to the spatial grid is less than or equal to the transmit power threshold corresponding to the spatial grid.

It should be understood that the beam domain may also be understood as a concept of an angle domain or an angle range. Generally, the beam domain is an angle range covered by one or more beams, and one beam domain may include one or more spatial grids. If power back-off and/or beam gain suppression are/is performed on the beam corresponding to the beam domain, a transmit power of the one or more spatial grids included in the beam domain may be reduced.

Implementation 5: The network device schedules carriers at an interval for one or more terminal devices in a beam domain corresponding to the spatial grid.

One beam includes a plurality of carriers (or subcarriers). When the network device determines that a transmit power corresponding to a spatial grid exceeds a transmit power threshold corresponding to the spatial grid, the network device may further schedule carriers at an interval for one or more terminal devices in a beam domain corresponding to the spatial grid, to reduce a quantity of carriers scheduled for the one or more terminal devices in the beam domain corresponding to the spatial grid. Therefore, a sum of powers occupied by the carriers is reduced, so that a sum of powers occupied by actually used carriers is less than or equal to a power threshold corresponding to the spatial grid.

In the foregoing one or more manners of scheduling the RB or the carrier of the one or more terminal devices corresponding to the spatial grid, when a transmit power corresponding to any spatial grid exceeds a transmit power threshold corresponding to the spatial grid, the transmit power corresponding to the spatial grid can be reduced, so that the transmit power corresponding to the spatial grid is less than or equal to the transmit power threshold corresponding to the spatial grid. Therefore, a requirement for safety of radio wave electromagnetic radiation is met.

In a possible implementation, the network device may perform transmit power control by using a transmission time interval (TTI) as a control interval for data transmission with the one or more terminal devices, to ensure that a transmit power corresponding to each spatial grid is less than or equal to a transmit power threshold corresponding to the spatial grid.

Figure 10:
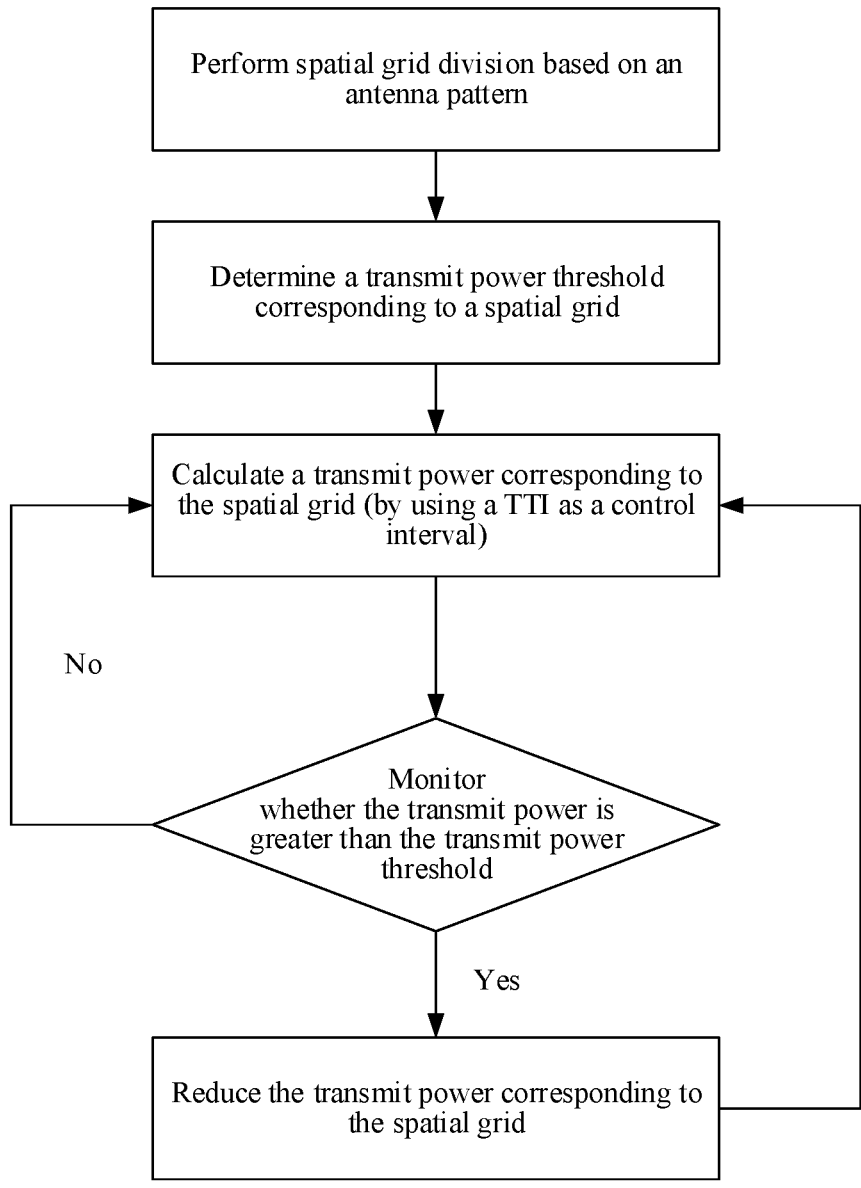
FIG. 10 is a second schematic flowchart of a transmit power control method according to an embodiment of this application.

As shown in FIG. 10, the network device may perform spatial grid division based on an antenna pattern. After performing spatial grid division, for any spatial grid, the network device determines a transmit power threshold corresponding to the spatial grid, may calculate a transmit power corresponding to the spatial grid by using a TTI as a control interval, and monitor whether the transmit power corresponding to the spatial grid is greater than the transmit power threshold corresponding to the spatial grid. If the transmit power corresponding to the spatial grid is greater than the transmit power threshold corresponding to the spatial grid, the network device may reduce the transmit power corresponding to the spatial grid in any one of the foregoing implementation 1 to implementation 5, and return to the step of calculating the transmit power corresponding to the spatial grid by using the TTI as the control interval to recalculate a transmit power corresponding to the spatial grid when a next control moment arrives. If the transmit power corresponding to the spatial grid is not greater than the transmit power threshold corresponding to the spatial grid, the network device directly returns to the step of calculating the transmit power corresponding to the spatial grid by using the TTI as the control interval to recalculate a transmit power corresponding to the spatial grid when a next control moment arrives. Transmit power control is performed on the spatial grid by using the TTI as the control interval, so that it can be ensured that the transmit power corresponding to the spatial grid does not exceed a corresponding transmit power threshold at any moment. Therefore, the requirement for safety of radio wave electromagnetic radiation is met.

The transmit power control solution provided in this embodiment of this application is applicable to all frequency bands. To be specific, in this embodiment of this application, space-time-frequency three-dimensional scheduling is performed on a plurality of spatial grids, so that the network device can ensure that a transmit power corresponding to each spatial grid is less than or equal to a transmit power threshold corresponding to the spatial grid. Therefore, the requirement for safety of radio wave electromagnetic radiation is met. Space (namely, spatial) scheduling is embodied in that transmit power control may be performed on all spatial directions (namely, the spatial grid), that is, EMF control is performed on all the spatial directions. Time scheduling is embodied in that the network device may perform transmit power control by using the TTI as the control interval, to ensure that the transmit power corresponding to each spatial grid does not exceed the corresponding transmit power threshold at any moment. Frequency scheduling is embodied in that the method is applicable to all frequency bands.

The foregoing mainly describes the solutions provided in embodiments of this application from a perspective of the network device. It may be understood that to implement the foregoing functions, the network element includes a corresponding hardware structure and/or software module (or unit) for implementing each function. A person skilled in the art should easily be aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 11:
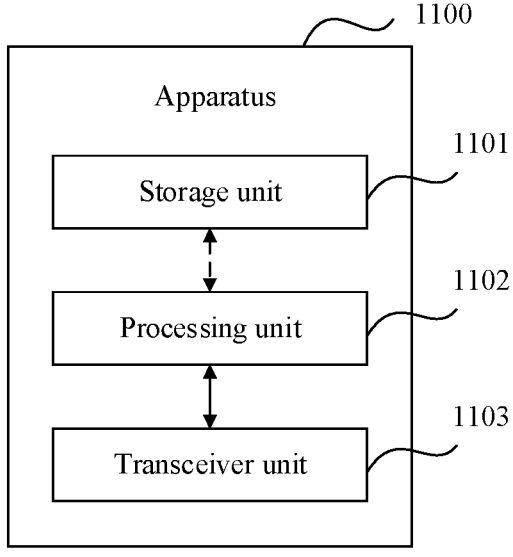
FIG. 11 is a first schematic diagram of a transmit power control apparatus according to an embodiment of this application.

When an integrated unit (module) is used, FIG. 11 shows a possible example block diagram of a transmit power control apparatus according to an embodiment of this application. The transmit power control apparatus 1100 may exist in a form of software. The apparatus 1100 may include: a processing unit 1102 and a transceiver unit 1103.

In a possible design, the processing unit 1102 is configured to implement a corresponding processing function. The transceiver unit 1103 is configured to support the apparatus 1100 in communicating with another network entity. Optionally, the transceiver unit 1103 may include a receiving unit and/or a sending unit, which are respectively configured to perform a receiving operation and a sending operation. Optionally, the apparatus 1100 may further include a storage unit 1101, configured to store program code and/or data of the apparatus 1100.

The apparatus 1100 may be the network device in any one of the foregoing embodiments, or may be a component such as a chip disposed in the network device. The processing unit 1102 may support the apparatus 1100 in performing an action of the network device in the foregoing method examples. Alternatively, the processing unit 1102 mainly performs an internal action of the network device in the method examples, and the transceiver unit 1103 may support communication between the apparatus 1100 and a terminal device or the like.

Specifically, in an embodiment, the processing unit 1102 is configured to determine a transmit power threshold corresponding to a spatial grid.

The transceiver unit 1103 is configured to schedule a resource block RB or a carrier of one or more terminal devices corresponding to the spatial grid, to control a transmit power corresponding to the spatial grid to be less than or equal to the transmit power threshold corresponding to the spatial grid.

In a possible design, a quantity of spatial grids is N, and N is a positive integer greater than or equal to 2.

In a possible design, when scheduling the RB of the one or more terminal devices corresponding to the spatial grid, the transceiver unit 1103 is specifically configured to: enable a plurality of terminal devices corresponding to the spatial grid to share the RB; or reduce a power spectral density of the RB of the one or more terminal devices corresponding to the spatial grid; or reduce a quantity of RBs of the one or more terminal devices corresponding to the spatial grid.

In a possible design, when reducing the quantity of RBs of the one or more terminal devices corresponding to the spatial grid, the transceiver unit 1103 is specifically configured to schedule RBs at an interval for the one or more terminal devices corresponding to the spatial grid.

In a possible design, when scheduling the RB of the one or more terminal devices corresponding to the spatial grid, the transceiver unit 1103 is specifically configured to perform power back-off and/or beam gain suppression on a beam corresponding to the spatial grid.

In a possible design, when scheduling the carrier of the one or more terminal devices corresponding to the spatial grid, the transceiver unit 1103 is specifically configured to schedule carriers at an interval for the one or more terminal devices in a beam domain corresponding to the spatial grid.

In a possible design, the processing unit 1102 is further configured to determine the transmit power corresponding to the spatial grid based on a sum of projected powers that are on the spatial grid and that are of power weight vectors corresponding to the one or more terminal devices communicating with the processing unit.

In a possible design, the transmit power threshold corresponding to the spatial grid satisfies a formula $E=4\pi R^2 S$. E is the transmit power threshold corresponding to the spatial grid, S is a power spectral density limit, and R is a safety distance corresponding to the spatial grid.

In a possible design, the processing unit 1102 is further configured to perform spatial grid division based on an antenna pattern.

Figure 12:
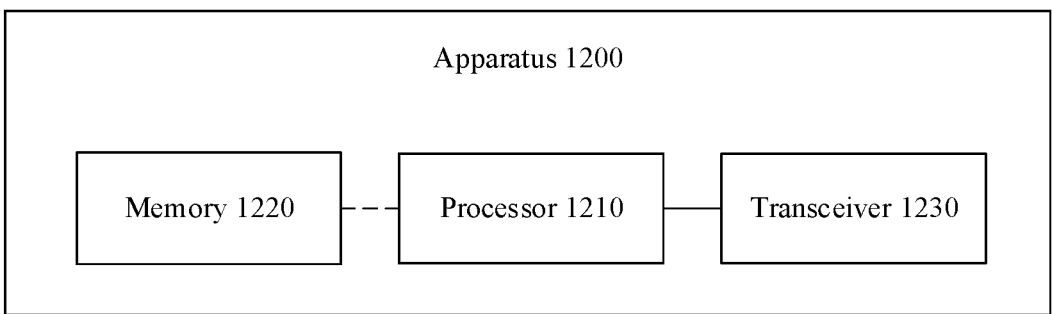
FIG. 12 is a second schematic diagram of a transmit power control apparatus according to an embodiment of this application.

As shown in FIG. 12, an embodiment of this application further provides a transmit power control apparatus 1200. The transmit power control apparatus 1200 includes a processor 1210 and a transceiver 1230, and may further include a memory 1220. In a possible design, the memory 1220 stores instructions, a program, or data, and the memory 1220 may be configured to implement a function of the storage unit 1101 in the foregoing embodiment. The processor 1210 is configured to read the instructions, the program, or the data stored in the memory 1220. When the instructions or the program stored in the memory 1220 are/is executed, the processor 1210 is configured to perform an operation performed by the processing unit 1102 in the foregoing embodiment, and the transceiver 1230 is configured to perform an operation performed by the transceiver unit 1103 in the foregoing embodiment.

In another form of this embodiment, a computer-readable storage medium is provided. The computer-readable storage medium stores instructions. When the instructions are executed, the transmit power control method applicable to the network device in the foregoing method embodiments may be performed.

In another form of this embodiment, a computer program product including instructions is provided. When the instructions are executed, the transmit power control method applicable to the network device in the foregoing method embodiments may be performed.

In another form of this embodiment, a chip is provided. When the chip runs, the transmit power control method applicable to the network device in the foregoing method embodiments may be performed.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or the block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device to generate computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, a person skilled in the art can make changes and modifications to these embodiments once they learn the basic inventive concept. Therefore, the following claims are intended to be construed as to cover the preferred embodiments and all changes and modifications falling within the scope of this application.

Clearly, a person skilled in the art can make various modifications and variations to embodiments of this application without departing from the spirit and scope of embodiments of this application. Therefore, this application is also intended to cover these modifications and variations provided that these modifications and variations of embodiments of this application fall within the scope of the claims of this application and their equivalent technologies.

What is claimed is:

1. A method, comprising:
   dividing, by a network device, space into a plurality of spatial grids;
   for each spatial grid of the plurality of spatial grids, determining, by the network device, a transmit power threshold corresponding to the spatial grid; and
   scheduling, by the network device, a resource block (RB) of one or more terminal devices corresponding to the spatial grid to control a transmit power corresponding to the spatial grid to be less than or equal to the transmit power threshold corresponding to the spatial grid, wherein scheduling the RB of the one or more terminal devices corresponding to the spatial grid comprises:
      enabling, by the network device, a plurality of terminal devices corresponding to the spatial grid to share the RB;
      reducing, by the network device, a power spectral density of the RB of the one or more terminal devices corresponding to the spatial grid; or
      reducing, by the network device, a quantity of RBs of the one or more terminal devices corresponding to the spatial grid.

2. The method according to claim 1, wherein the network device determines the transmit power corresponding to the spatial grid based on a sum of projected powers that are on the spatial grid and that are of power weight vectors corresponding to the one or more terminal devices communicating with the network device.

3. The method according to claim 1, wherein the transmit power threshold corresponding to the spatial grid satisfies $E=4\pi R^2 S$, and wherein E is the transmit power threshold corresponding to the spatial grid, S is a power spectral density limit, and R is a safety distance corresponding to the spatial grid.

4. The method according to claim 1, wherein reducing, by the network device, the quantity of RBs of the one or more terminal devices corresponding to the spatial grid comprises:
   scheduling, by the network device, RBs at an interval for the one or more terminal devices corresponding to the spatial grid.

5. The method according to claim 1, wherein scheduling, by the network device, the RB of the one or more terminal devices corresponding to the spatial grid comprises:
   performing, by the network device, at least one of power back-off or beam gain suppression on a beam corresponding to the spatial grid.

6. The method according to claim 1, wherein dividing, by the network device, the space into the plurality of spatial grids comprises:
   performing, by the network device, spatial grid division based on an antenna pattern.

7. A non-transitory computer-readable storage medium, wherein the storage medium stores a computer program or instructions which, when executed by a transmit power control apparatus, cause the transmit power control apparatus to perform operations comprising:
   dividing space into a plurality of spatial grids;
   for each spatial grid of the plurality of spatial grids, determining a transmit power threshold corresponding to the spatial grid; and
   scheduling a resource block (RB) of one or more terminal devices corresponding to the spatial grid to control a transmit power corresponding to the spatial grid to be less than or equal to the transmit power threshold corresponding to the spatial grid, wherein scheduling the RB of the one or more terminal devices corresponding to the spatial grid comprises:
      enabling a plurality of terminal devices corresponding to the spatial grid to share the RB;
      reducing a power spectral density of the RB of the one or more terminal devices corresponding to the spatial grid; or
      reducing a quantity of RBs of the one or more terminal devices corresponding to the spatial grid.

8. The non-transitory computer-readable storage medium according to claim 7, wherein reducing the quantity of RBs of the one or more terminal devices corresponding to the spatial grid comprises:
   scheduling RBs at an interval for the one or more terminal devices corresponding to the spatial grid.

9. The non-transitory computer-readable storage medium according to claim 7, wherein scheduling the RB of the one or more terminal devices corresponding to the spatial grid comprises:
   performing at least one of power back-off or beam gain suppression on a beam corresponding to the spatial grid.

10. The non-transitory computer-readable storage medium according to claim 7, wherein the transmit power control apparatus determines the transmit power corresponding to the spatial grid based on a sum of projected powers that are on the spatial grid and that are of power weight vectors corresponding to the one or more terminal devices communicating with the transmit power control apparatus.

11. The non-transitory computer-readable storage medium according to claim 7, wherein the transmit power threshold corresponding to the spatial grid satisfies $E=4\pi R^2 S$, and wherein E is the transmit power threshold corresponding to the spatial grid, S is a power spectral density limit, and R is a safety distance corresponding to the spatial grid.

12. The non-transitory computer-readable storage medium according to claim 7, wherein dividing the space into the plurality of spatial grids comprises:
   performing spatial grid division based on an antenna pattern.

13. An apparatus, comprising:
   at least one processor;
   a transceiver; and
   one or more memories coupled to the at least one processor and storing programming instructions for execution by the at least one processor to cause the apparatus to:
      divide space into a plurality of spatial grids;
      for each spatial grid of the plurality of spatial grids, determine a transmit power threshold corresponding to the spatial grid; and
      schedule a resource block (RB) of one or more terminal devices corresponding to the spatial grid to control a transmit power corresponding to the spatial grid to be less than or equal to the transmit power threshold corresponding to the spatial grid, wherein scheduling the RB of the one or more terminal devices corresponding to the spatial grid comprises:

enabling a plurality of terminal devices corresponding to the spatial grid to share the RB;

reducing a power spectral density of the RB of the one or more terminal devices corresponding to the spatial grid; or reducing a quantity of RBs of the one or more terminal devices corresponding to the spatial grid.

14. The apparatus according to claim 13, wherein when scheduling the RB of the one or more terminal devices corresponding to the spatial grid, the programming instructions are for execution by the at least one processor to cause the apparatus to perform at least one of power back-off or beam gain suppression on a beam corresponding to the spatial grid.

15. The apparatus according to claim 13, wherein when reducing the quantity of RBs of the one or more terminal devices corresponding to the spatial grid, the programming instructions are for execution by the at least one processor to cause the apparatus to schedule RBs at an interval for the one or more terminal devices corresponding to the spatial grid.

16. The apparatus according to claim 13, wherein the programming instructions are for execution by the at least one processor to cause the apparatus to determine the transmit power corresponding to the spatial grid based on a sum of projected powers that are on the spatial grid and that are of power weight vectors corresponding to the one or more terminal devices communicating with the apparatus.

17. The apparatus according to claim 13, wherein the transmit power threshold corresponding to the spatial grid satisfies $E=4\pi R^2 S$, and wherein E is the transmit power threshold corresponding to the spatial grid, S is a power spectral density limit, and R is a safety distance corresponding to the spatial grid.

18. The apparatus according to claim 13, wherein the programming instructions are for execution by the at least one processor to cause the apparatus to perform spatial grid division based on an antenna pattern.

* * * * *